(12) United States Patent
Guo et al.

(10) Patent No.: US 9,494,781 B2
(45) Date of Patent: Nov. 15, 2016

(54) PLANE-PROJECTION MULTI-PHOTON MICROSCOPY

(75) Inventors: Chin-Lin Guo, Pasadena, CA (US); Jiun-Yann Yu, Pasadena, CA (US); Chun-Hung Kuo, Irvine, CA (US)

(73) Assignee: California Institute of Technology, Pasadena, CA (US)

(*) Notice: Subject to any disclaimer, the term of this patent is extended or adjusted under 35 U.S.C. 154(b) by 750 days.

(21) Appl. No.: 13/352,752

(22) Filed: Jan. 18, 2012

(65) Prior Publication Data

US 2012/0182413 A1    Jul. 19, 2012

Related U.S. Application Data

(60) Provisional application No. 61/434,289, filed on Jan. 19, 2011, provisional application No. 61/437,087, filed on Jan. 28, 2011, provisional application No. 61/557,000, filed on Nov. 8, 2011.

(51) Int. Cl.
*G02B 21/06*       (2006.01)

(52) U.S. Cl.
CPC ......... *G02B 21/06* (2013.01); *G02B 2207/114* (2013.01)

(58) Field of Classification Search
CPC ..................................................... H04N 7/18
USPC ............................................................ 348/79
See application file for complete search history.

(56) References Cited

U.S. PATENT DOCUMENTS

| 5,034,613 | A * | 7/1991 | Denk | G01N 21/6402 250/458.1 |
| 6,262,423 | B1 * | 7/2001 | Hell | G02B 21/002 250/458.1 |
| 6,344,653 | B1 * | 2/2002 | Webb | G02B 21/0084 250/458.1 |
| 6,400,487 | B1 * | 6/2002 | Harris | G02B 21/0028 250/201.2 |
| 6,677,596 | B2 * | 1/2004 | Engelhardt | G01N 21/6458 250/458.1 |

(Continued)

FOREIGN PATENT DOCUMENTS

WO    2012103420    2/2012

OTHER PUBLICATIONS

Cahalan et al., "Two-Photon Tissue Imaging: Seeing the Immune System in a Fresh Light", Nat. Rev. Immunol., Nov. 2002, vol. 2, No. 11, 20 pgs.

(Continued)

*Primary Examiner* — Jay Patel
*Assistant Examiner* — Irfan Habib
(74) *Attorney, Agent, or Firm* — KPPB LLP (57) ABSTRACT

A novel method and system for conducting wide-field multi-photon microscopy through plane-projection are provided. It has been discovered that the limitations of conventional temporal-focusing techniques, such as single excitation wavelength and low acquisition rates can be resolved utilizing a novel optical set-up in which an optical diffuser is used as the scatterer. The use of such an optical arrangement enables temporal focusing regardless of the central wavelength of laser pulses. In addition, the optical sectioning possible using the disclosed microscopy is comparable to confocal microscopy, and can be robustly achieved by both moderate and high NA objectives at 100-fs pulse width. Moreover, the multi-photon excitation efficiency of the disclosed system can be enhanced by lowering the repetition rate of the ultrafast laser light source at constant pulse width and average power.

36 Claims, 9 Drawing Sheets

(56) References Cited

U.S. PATENT DOCUMENTS

| | | | | |
|---|---|---|---|---|
| 6,751,016 | B2* | 6/2004 | Fukuyama | G02B 21/0032 250/201.9 |
| 6,844,963 | B2* | 1/2005 | Iketaki | G01J 3/4406 250/458.1 |
| 7,170,675 | B2* | 1/2007 | Brooker | G02B 21/0076 250/458.1 |
| 2003/0063379 | A1* | 4/2003 | Fukuyama | G02B 21/0032 359/390 |
| 2003/0151742 | A1* | 8/2003 | Silvermintz | G02B 21/0024 356/318 |
| 2005/0024720 | A1* | 2/2005 | Cartlidge | G02B 21/0008 359/368 |
| 2005/0259319 | A1* | 11/2005 | Brooker | G02B 21/0076 359/368 |
| 2005/0263690 | A1* | 12/2005 | Araya | G02B 26/101 250/234 |
| 2006/0237666 | A1* | 10/2006 | Kubo | G01J 3/10 250/458.1 |
| 2007/0091307 | A1* | 4/2007 | Brooker | G02B 21/0076 356/318 |
| 2007/0139541 | A1* | 6/2007 | Fein | G01N 21/6458 348/294 |
| 2008/0220985 | A1 | 9/2008 | Bridgman et al. | |

OTHER PUBLICATIONS

Cerullo et al., "Ultrafast optical parametric amplifiers", Review of Scientific Instruments, Jan. 2003, vol. 74, No. 1, pp. 1-18.

Huisken et al., "Optical Sectioning Deep Inside Live Embryos by Selective Plane Illumination Microscopy", Science, 2004, vol. 305, pp. 1007-1009.

Kim et al., "Collagen Structure and Nonlinear Susceptibility: Effects of Heat, Glycation, and enzymatic Cleavage on Second Harmonic Signal Intensity", Lasers in Surgery and Medicine, 2000, vol. 27, pp. 329-335.

Martin-Belmonte et al., "Regulation of cell polarity during epithelial morphogenesis", Current Opinion in Cell Biology, 2008, vol. 20, pp. 227-234.

International Search Report for International Application No. PCT/US2012/022870, International Filing Date Jan. 27, 2012, Search Completed Jun. 20, 2012, mailed Jun. 20, 2012, 7pgs.

Masters et al., "Mitigating thermal mechanical damage potential during two-photon dermal imaging", Journal of Biomedical Optics, Nov./Dec. 2004, vol. 9, No. 6, pp. 1265-1270.

Muthuswamy et al., "ErbB2, but not ErbB1, reinitiates proliferation and induces luminal repopulation in epithelial acini", Nature Cell Biology, Sep. 2001, vol. 3, pp. 785-794.

Neil et al., "Method of obtaining optical sectioning by using structured light in a conventional microscope", Optics Letters, Dec. 15, 1997, vol. 222, No. 24, pp. 1905-1907.

Nisoli et al., "Highly efficient parametric conversion of femtosecond Ti:sapphire laser pulses at 1 kHz", Optics Letters, Dec. 1, 1994, vol. 19, No. 23, pp. 1973-1975.

Oron et al., "Scanningless depth-resolved microscopy", Optics Express,, Mar. 7, 2005, vol. 13, No. 5, pp. 1468-1476.

Petersen et al., "Interaction with basement membrane serves to rapidly distinguish growth and differentiation pattern of normal and malignant human breast epithelial cells", Proc. Natl. Acad. Sci. USA, Oct. 1992, vol. 89, pp. 9064-9068.

Piel et al., "20-50-fs pulses tunable across the near infrared from a blue-pumped noncollinear parametric amplifier", Optics Letters, Feb. 1, 2000, vol. 25, No. 3, pp. 180-182.

Potter, "Vital imaging: Two photons are better than one", Current Biology, 1996, vol. 6, No. 12, pp. 1595-1598.

Wilson et al., "Ultrafast rainbow: tunable ultrashort pulses from a solid-state kilohertz system", J. Opt. Soc. Am. B., Feb. 1997, vol. 14, No. 2, pp. 444-448.

Yu et al., "Wide-field optical sectioning for live-tissue imaging by plane-projection multiphoton microscopy", Journal of Biomedical Optics, Nov. 2011, vol. 16, No. 11, pp. 116009-1-116009-9.

* cited by examiner

Fixated diffuser
STD/AVG ≈ 1

Rotated diffuser
STD/AVG ≈ 0.3

PLANE-PROJECTION MULTI-PHOTON MICROSCOPY

CROSS-REFERENCE TO RELATED APPLICATIONS

This application claims priority to U.S. Provisional Application No. 61/434,289, filed Jan. 19, 2011; 61/437,087, filed Jan. 28, 2011; and 61/557,000, filed Nov. 8, 2011, the disclosures of which are incorporated herein by reference.

FIELD OF THE INVENTION

This invention relates generally to a novel method and apparatus for conducting wide-field multi-photon microscopy; and more particularly to a method and apparatus for conducting plane-projection multi-photon microscopy.

BACKGROUND OF THE INVENTION

The major advantage of confocal and multi-photon laser scanning microscopy over conventional epifluorescence microscopy is the capability to perform optical sectioning. To obtain images at reasonable frame rate, however, the excitation intensity of laser scanning microscopy often has to be several-fold stronger than that of epifluorescence microscopy. This is due to the extremely short dwell time per pixel in scanning microscopy. Consequently, for confocal microscopy, significant photo-toxicity can occur in scanned live organisms if a fast time-lapse microscopy is required. (See, e.g. J. B. Pawley, Handbook of biological confocal microscopy, Springer, New York, N.Y., third edition (2006), the disclosure of which is incorporated herein by reference.) On the other hand, multi-photon microscopy has been reported to induce lower photo-toxicity, but it has also been shown to introduce thermal mechanical damage to live tissues through the single-photon absorption of infrared excitation. (See, e.g., S. Potter, Current Biology 6(12), 1595-1598 (1996); M. Cahalan, et al., Nature Reviews Immunology 2(11), 872-880 (2002); and B. Masters, et al., Journal of Biomedical Optics 9(6), 1265-1270 (2004), the disclosures of which are incorporated herein by reference.)

One potential way to resolve photo- and thermo-damage in scanning microscopy and gain speed for image acquisition is to implement the capability of optical sectioning in wide-field microscopy. Several methods have been proposed, such as light-sheet illumination microscopy and structured light microscopy [6]. (See, e.g., J. Huisken, et al., Science 305(5686), 1007-1009 (2004); and M. Neil, et al., Optics Letters 22(24), 1905-1907 (1997), the disclosures of each of which are incorporated herein by reference.) Both methods are technically complicated due to the requirement of additional mechanical parts that synchronize with axial scanning components. For example, light-sheet microscopy obtains optical sectioning by illuminating the sample from lateral side; this introduces mechanical complexity into the optical system as well as makes the preparation of samples difficult. In addition, structured light microscopy needs to take multiple images and retrieve the axial resolution by computing the signal root mean square at each pixel. This reduces the image acquisition rate and is an inefficient use of the quantum yield of the fluorophores.

Recently, Oron et al. have developed a technique, referred to as temporal focusing, to obtain optical sectioning in a wide-field setup of multi-photon microscopy. (See, D. Oron, et al., Opt Express 13(5), 1468-76 (2005), the disclosure of which is incorporated herein by reference.) In their study, temporal focusing was achieved using a blazed diffraction grating as a scatterer. In such a technique, different wavelengths of light re-gain their coherence only when they meet at the image plane, thereby creating the optical sectioning. However, the signal level is several orders of magnitude weaker than that can be achieved by conventional scanning microscopy, due to the inevitable reduction of multi-photon excitation efficiency in the setup. This leads to a significant reduction of the image acquisition rate even for tissues stained with fluorescent dye, which is usually much brighter than fluorescent protein expressed in live tissues. In Oron et al.'s work, the frame rate is roughly 0.033 frames per second (fps) at cells stained with DAPI (a bright dye for chromosome staining). In addition, the core component in current temporal focusing setup, a blazed diffraction grating, is fabricated for a specific wavelength window each. This increases the systems complexity when two or more excitation wavelengths are required for the application, which is common in most biomedical studies.

Accordingly, a need exists to find a novel approach to perform multi-photon microscopy that reduces system complexity and photo-toxicity, while maintaining the spatial resolution, frame rate and other optical advantages of the technique.

BRIEF SUMMARY OF THE INVENTION

In accordance with the current invention, there is provided a plane-projection multi-photon microscope, method of imaging a sample using such a microscope, and a method of manufacturing such a microscope.

In one such embodiment, the invention is directed to a plane-projection multi-photon microscope including:
  a sample holder;
  at least one excitation source, said excitation source being capable of producing an excitation power of adequate intensity to induce significant levels of multi-photon excitation in a sample and being disposed such that the excitation is directed along at least one excitation beam path;
  at least one excitation optic for transforming the excitation source into an excitation plane of temporally separated point light sources and focusing and confining the peak excitation intensity of said excitation plane onto and within at least a portion of the sample holder; and
  an imaging detector defining at least one detection beam path and capable of detecting a excitation generated signal contrast from the sample excitation region, the detector being disposed such that the detection direction of the at least one detection beam path is substantially orthogonal to the sample excitation region.

In one such embodiment the number of photons in the multi-photon excitation is two.

In another such embodiment, the excitation source is a pulsed near-infrared laser selected from the group consisting of lasers having peak duration in the nanosecond, picosecond, and femtosecond range.

In still another such embodiment, the detected signal contrast is selected from the group consisting of fluorescence, harmonic generation, sum frequency generation, and Raman scattering.

In yet another such embodiment, the excitation optic comprises at least one lens.

In still yet another such embodiment, the excitation optic comprises at least an optical diffuser. In one such embodiment, the diffuser is chosen such that the roughness of the image plane is constrained below one Rayleigh length. In another such embodiment, the diffuser is rotatable in a stepwise manner.

In still yet another such embodiment, the numerical aperture of the excitation focusing optics is adjustable.

In still yet another such embodiment, the excitation source is a pulse laser, and wherein the pulse energy is higher than 1 µl.

In still yet another such embodiment, the excitation source is a pulse laser, and wherein the pulse duration is ~30 fs.

In still yet another such embodiment, the excitation optic comprises a plurality of microlenses having uniform size and a distribution of axial heights. In one such embodiment, the difference in axial height between any two adjacent microlenses is chosen such that the time delay between the two adjacent microlenses is equal to or larger than the pulse duration of a pulse from the excitation source. In one such embodiment, the minimal difference in axial height between any two adjacent microlenses is 20 µm, given the refractive index of the lens material is ~1.5. In another such embodiment, the lateral spacing between any two adjacent microlenses is constant. In still another such embodiment, the NA of the microlenses is constant. In yet another such embodiment, the focal spots generated by adjacent microlenses partially overlap. In still yet another such embodiment, the microlenses are spaced such that the lateral spacing multiplied by the de-magnification factor ($f_S/f_D$) is equal to or less than the size of the diffraction-limited spot of the microscope. In still yet another such embodiment, the lateral spacing is between 10 and 20 µm. In still yet another such embodiment, the NA of the microlenses is larger than $D_O/2f_D$, where Do is the diameter of the back aperture of the focusing optic. In still yet another such embodiment, the NA of the microlenses is between 0.08 and 0.06.

In still yet another such embodiment, the microscope further comprises an optical parametric amplifier to simultaneously generate a multi-wavelength excitation source.

The invention is also directed to a method of imaging an object using plane-projection multi-photon microscope including:
  providing at least one excitation source, said excitation source being capable of producing an excitation power of adequate intensity to induce significant levels of multi-photon excitation in a sample and being disposed such that the excitation is directed along at least one excitation beam path;
  directing said excitation through at least one excitation optic to transform the excitation source into an excitation plane of temporally separated point light sources and focusing and confining the peak excitation intensity of said excitation plane onto and within at least a portion of a sample holder; and
  imaging the excitation through an imaging detector defining at least one detection beam path and capable of detecting a excitation generated signal contrast from the sample excitation region, the detector being disposed such that the detection direction of the at least one detection beam path is substantially orthogonal to the sample excitation region.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

The current invention is directed to a novel method and system for conducting wide-field multi-photon microscopy through plane-projection. It has been discovered that the limitations of conventional temporal-focusing techniques, such as single excitation wavelength and low acquisition rates can be resolved utilizing a novel optical set-up in which an optical diffuser is used as the scatterer. The use of such a novel optical diffuser scatterer enables temporal focusing regardless of the central wavelength of laser pulses. In addition, the optical sectioning possible using the inventive microscopy is comparable to confocal microscopy, and can be robustly achieved by both moderate and high NA objectives at 100-fs pulse width. Moreover, the multi-photon excitation efficiency of the inventive system can be enhanced by lowering the repetition rate of the ultrafast laser light source at constant pulse width and average power.

Figure 1:
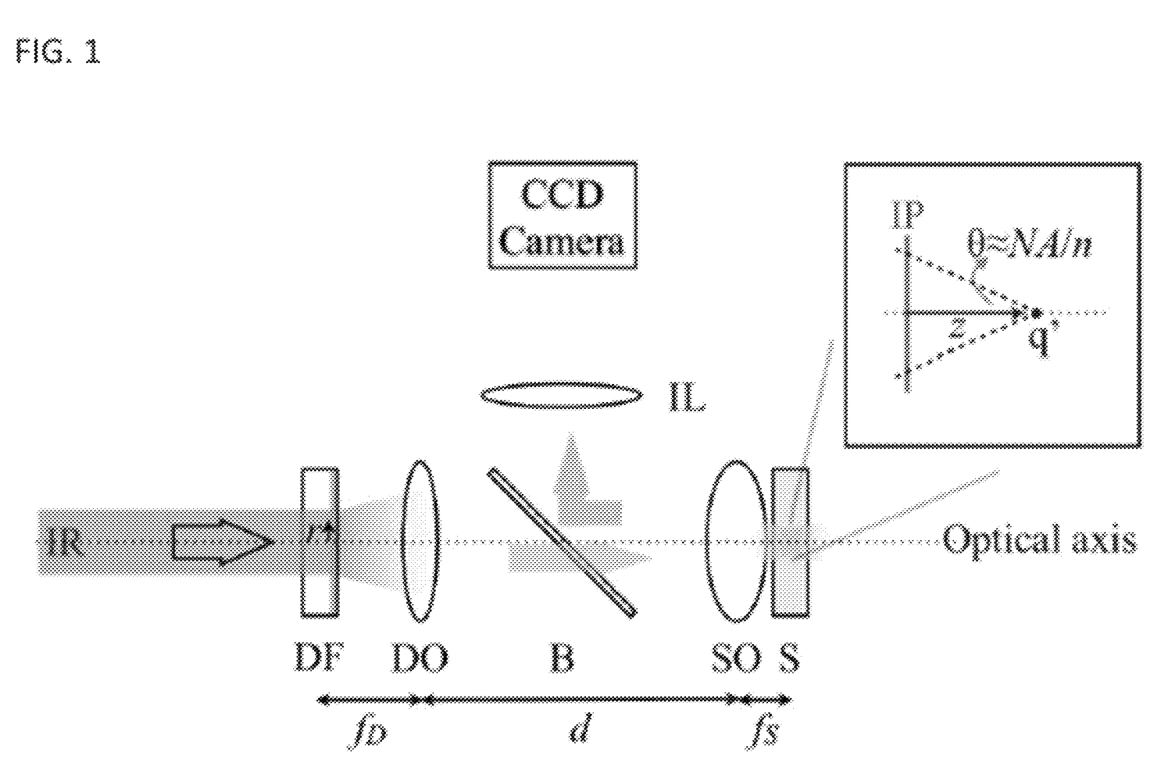
FIG. 1 provides a schematic of a plane-projection multi-photon microscope in accordance with the current invention, and where the zoom-in inset shows the angle of the light arriving.

FIG. 1 depicts the schematics of some embodiments of the temporal focusing multi-photon microscope of the instant invention. In such embodiments, an optical diffuser (DF) is used to transform an incoming excitation light source (IR) into a plane of temporally separated point light sources (Arrow), which is then projected to an image plane overlaying a sample (S) through a set of optics (in this case two objectives: a diffuser objective (DO) and sample objective (SO)). The signal is then collected by an imager (CCD), such as, for example, a CCD camera through a beam splitter (B) and imager optic (IL) set, in this example, orthogonal to the axis of the excitation light source. The zoom-in inset shows that light arriving q' is mainly from points within a cone angle q on the image plane, as will be discussed in greater detail below.

Although one particular set-up using particular components is shown, it should be understood that any suitable replacement components may be used in the invention, including alternative excitation sources, optical arrangements and imager as long as the excitation source generates sufficient excitation power to induce significant levels of multi-photon process in a sample and is directed through an optical arrangement such as a diffuser capable of transforming the excitation source into a plane of temporally separated point light sources that can be projected onto the image plane. For example, the multi-photon process may be multi-photon excitation or harmonic generations, and the imager may be any array-wise imaging device such as a CCD or CMOS camera.

The following discussion will provide an analysis of the capabilities of the inventive plane-projection multi-photon microscopy technique of the current invention with regards to the two critical deficiencies in conventional temporal-focusing microscopy: the efficiency of its temporal focusing; and the efficiency of the excitation at low repetition rates.

Efficiency of Temporal Focusing in the Inventive Device

First, the temporal focusing efficiency of the technique is considered. The elongation of pulse width at an out-of-focus point q' with a distance z away from the image plane can be estimated through the maximal difference of pulse arrival times from the point light sources within a cone angle $\Theta$ on the image plane (FIG. 1, inset). (See, e.g., Oron, et al., cited above.) Here, $\Theta$ can be determined by the divergence angle of SO, $\Theta \approx NA/n$ (FIG. 1 inset). To estimate the difference of pulse arrival times, we first considered the case where the diffuser is approximated as a flat plane of point light sources that simultaneously generate ultrafast light pulses, and computed the pulse arrival times from each individual point light sources within the cone angle $\Theta$ to the point q'. Using lens formula and paraxial approximation, the elongation of pulse width $\Delta t_G$ at the point q' is estimated as:

$$\Delta t_G(z) \approx \frac{(f_D + f_S - d)}{2C_0 \cdot n \cdot f_S^2} \cdot z^2 + n \frac{n - \sqrt{n^2 - NA^2}}{C_0 \cdot \sqrt{n^2 - NA^2}} \cdot z \quad \text{(EQ. 1)}$$

where $C_0$ is the speed of light in vacuum and n is the refractive index of the sample medium. The first term on the right hand side of EQ. 1 is contributed from the difference of optical path lengths from the diffuser surface to the image plane, and the second term results from the difference of optical path lengths from the image plane to the point q'.

Figure 2:
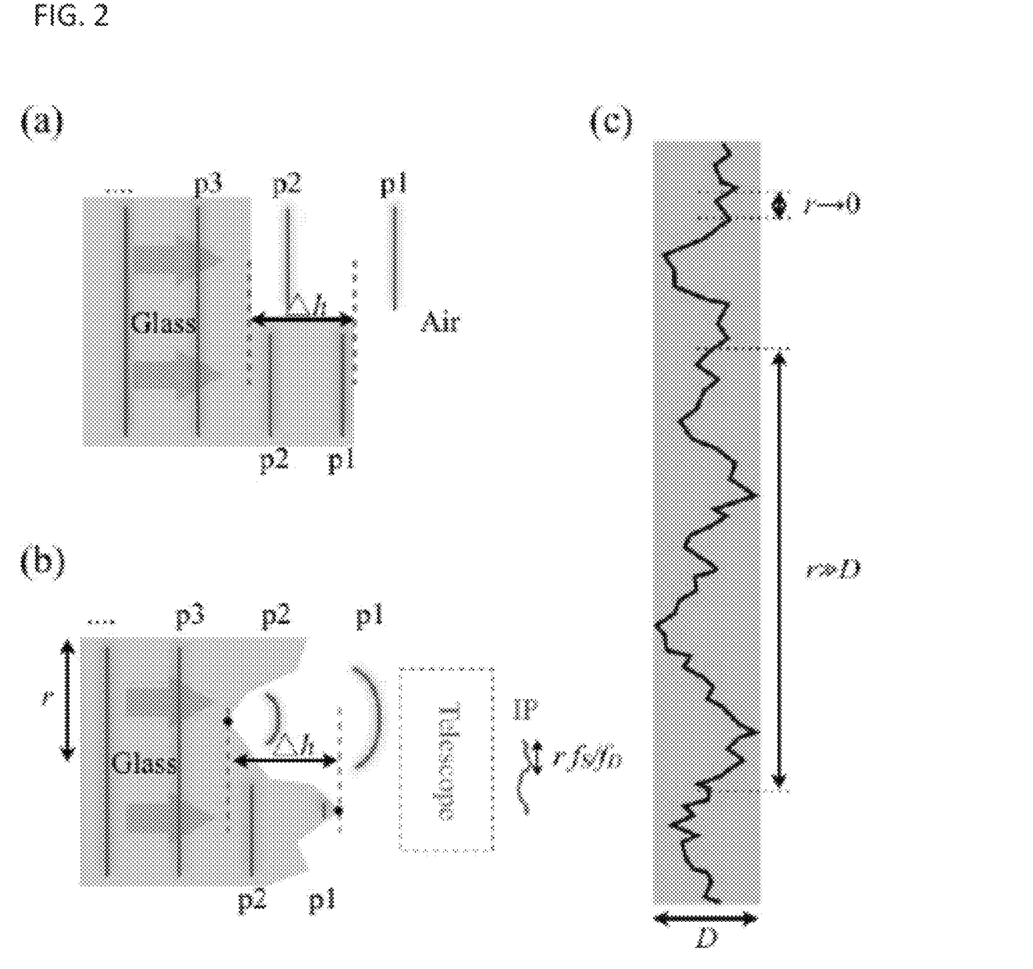
FIG. 2 provides a random time delay generate by surface roughness of an optical diffuser, wherein a) a time delay of laser pulses resulted from a discrepancy of height (Δh) on the diffuser surface, b) a more general case where (Δh) corresponds to the maximal surface height discrepancy (i.e., the peak-to-valley difference) within an area of radius (r) (the corresponding area on the image plane (IP) is of radius r fS/fD), and c) a schematic illustration of (Δh) under different scales of (r) (upper: when r→0, Δh→0; and lower: when r≫D, Δh≈D).

Next, the surface roughness of the diffuser is taken into account and an estimate is made as to how such roughness leads to a randomness of arrival times. To proceed, a simple case is considered where the roughness is represented by a step function with a height discrepancy $\Delta h$ on the diffuser surface (FIG. 2a). The time delay of a pulse p1 induced by $\Delta h$ is given by:

$$\Delta h/C_{Glass} - \Delta h/C_{Air} = (n_{Glass} - n_{Air}) \cdot (\Delta h/C_0) \approx 0.5 \Delta h/C_0 \quad \text{(EQ. 2)}$$

Then the time delay caused by the roughness in a region $A_r$ of radius (r) on the diffuser surface is considered, which was projected into a region $A'_r$ of radius:

$$r' = \frac{f_S}{f_D} r \quad \text{(EQ. 3)}$$

on the image plane (FIG. 2b). The maximal delay $\Delta t_{RD}$ within $A_r'$ is approximated as:

$$\Delta t_{RD} = 0.5 \frac{\Delta h}{C_0} \quad \text{(EQ. 4)}$$

where $\Delta h$ is the maximal surface height discrepancy within $A_r$. In general, the roughness of an optical diffuser is generated by grinding a flat surface of glass with particles of size less than a certain length (D). Thus, we expect $\Delta h \to 0$ when $r \to 0$, and $\Delta h \approx D$ if $r \gg D$, as shown in FIG. 2c. To take into account these asymptotic estimations, a simple approximation is used wherein $\Delta h \approx \alpha \times 2r$ if $\alpha \times 2r < D$ and $\Delta h \approx D$ if $2r \geq D$, where $\alpha$ is a dimensionless parameter depending on the surface profile of the diffuser in use. Using this approximation, a simple estimation of the difference of arrival times $\Delta t_{RD}$ within $A_r$.

$$\Delta t_{RD} = \begin{cases} \frac{\alpha f_D}{C_0 \cdot f_S} \cdot r' & \text{if } \frac{\alpha f_D}{f_S} \cdot r' \leq 0.5D \\ \frac{0.5D}{C_0} & \text{if } \frac{\alpha f_D}{f_S} \cdot r' \geq 0.5D \end{cases} = \frac{1}{C_0} \cdot \text{Min}\left[\frac{\alpha f_D}{f_S} r', 0.5D\right] \quad \text{(EQ. 5)}$$

For the out-of-focus point q' shown in FIG. 1(inset), $A_r$, corresponds to the area covered by the cone angle q. Thus, $$r' \approx z \cdot \Theta \approx \frac{NA}{n} z \text{ and} \quad \text{(EQ. 6)}$$

$$\Delta t_{RD}(z) = \frac{1}{C_0} \cdot \text{Min}\left[\frac{\alpha f_D}{f_S} \cdot \frac{NA}{n} \cdot z, 0.5D\right]$$

Combining Equation 1 and 6, it is possible to obtain the effective pulse duration at an the out-of-focus point q' with a distance z away from the image plane, as follows:

$$\tau_{\it eff}(z) = \tau_0 + \Delta t_{RD} + \Delta t_G \quad \text{(EQ. 7)}$$

$$\tau_{\it eff}(z) = \tau_0 + \frac{\text{Min}\left[\frac{\alpha f_D}{f_S} \cdot \frac{NA}{n} z, 0.5D\right]}{C_0} + \frac{(f_D + f_S - d)NA^2}{2C_0 n f_S^2} z^2 + n \frac{n - \sqrt{n^2 - NA^2}}{C_0 \sqrt{n^2 - NA^2}} z \quad \text{(EQ. 8)}$$

where $\tau_0$ is the pulse width of the laser source.

Figure 3:
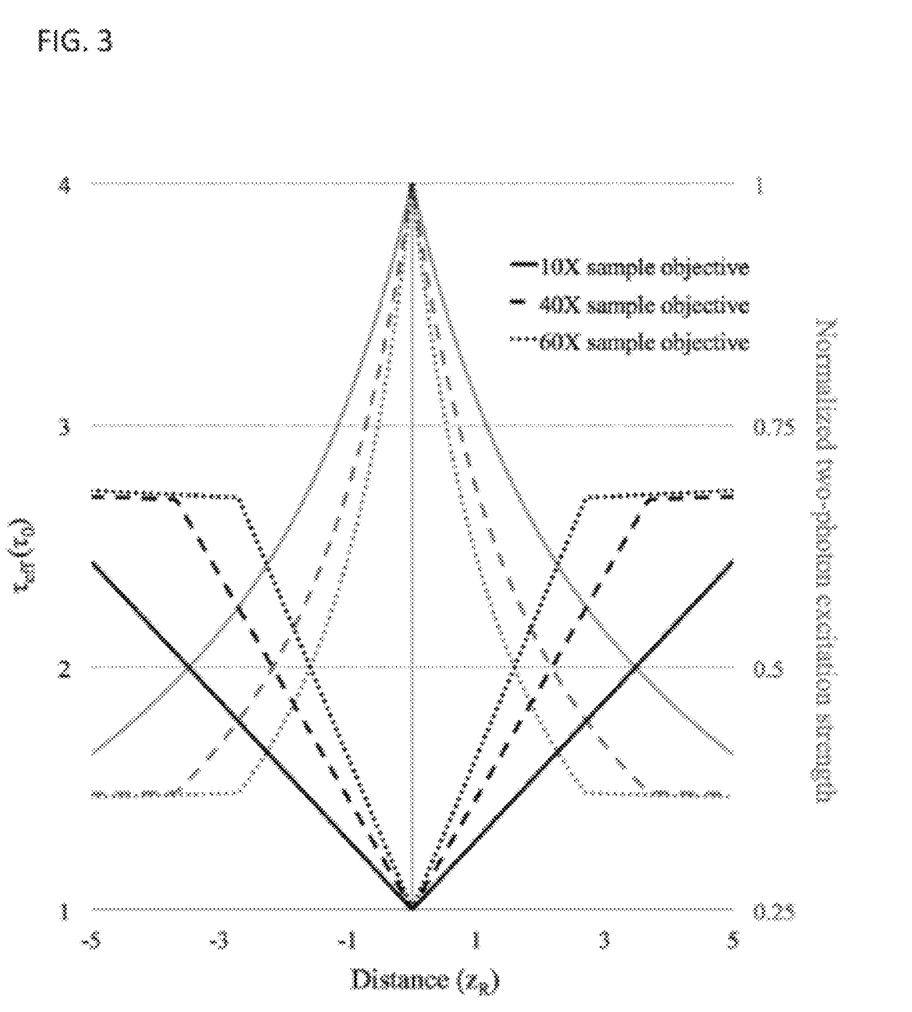
FIG. 3 provides a data plot showing effective pulse width and two-photon excitation strength as a function of z under different sample objectives, in accordance with the current invention.

FIG. 3 shows the numerical results of $\tau_{eff}(z)$ with three different sample objectives commonly used for biomedical microscopy. With the parameters widely used in biomedical microscopy, it is found that the contribution of $\Delta t_G$ to $\tau_{eff}(z)$ is negligible when z is only a few times of Rayleigh length $z_R$. The contribution from $\Delta t_{RD}$ in EQ. 8, however, can lead to a significant elongation of pulse width. For example, consider the small z regions where:

$$\frac{\alpha f_D}{f_s} \cdot \frac{NA}{n} \cdot z < 0.5D \quad \text{(EQ. 9)}$$

EQ. 8 can be simplified as:

$$\tau_{eff} \approx \tau_0\left(1 + \frac{\alpha f_D}{f_s} \cdot \frac{NA}{\tau_0 n C_0} z\right) = \tau_0\left(1 + \frac{\alpha f_D}{f_s} \cdot \frac{n\lambda}{\pi \tau_0 C_0 NA} \bar{z}\right), \quad \text{(EQ. 10)}$$

with $\bar{z} \equiv \frac{z}{z_R} \approx \frac{\pi NA^2}{n^2 \lambda} z$ where we define:

$$\bar{z}^* \equiv \frac{f_s}{f_D} \cdot \frac{\pi \tau_0 C_0 NA}{n\lambda} = \frac{\pi \tau_0 C_0}{\lambda \alpha f_D} \cdot \frac{f_s NA}{n} \quad \text{(EQ. 11)}$$

where $T_{eff} \approx 2\tau_0$ at $\bar{z}=\bar{z}^*$, i.e., the effective pulse width is twice the pulse width of the laser source at $\bar{z}=\bar{z}^*$.

Using these equations it is possible to estimate $\bar{z}^*$, with a SO of NA 0.3 and 16-mm $f_s$, a DO of 160-mm $f_D$, $\lambda$=800 nm, and $\tau_0$=100 fs, $\bar{z}^*\approx 3.5$. In general, $\bar{z}^*$ can be further reduced by using an objective with a higher magnification and NA (i.e., sample objective 40X: NA=0.75, $f_s$=4 mm, n=1; and sample objective 60X: NA=1.1, $f_s$=2.67 mm, n=1.33), which often exhibits a smaller $$\frac{f_s NA}{n},$$

as shown in FIG. 3. Likewise, using DO of larger $f_D$ or laser pulse with shorter To leads to smaller $\bar{z}^*$. (Note that EQ. 11 predicts $\bar{z}^*\approx 3.53$, 2.21, and 1.62 for these objectives, respectively, which are compatible with the numerical results. To estimate the normalized strength of two-photon excitation $S_{2p}$, the pulse energy was set as a constant and the inverse of $\tau_{eff}$ was used to represent $S_{2p}$ (EQ. 15, below). The distance and $\tau_{eff}$ are expressed in the unit of Rayleigh length and $\tau_0$, respectively.)

From EQ. 6, it can be realized that the difference of arrival times contributed from the surface roughness of diffuser is upper bound by the factor D. Accordingly, to ensure a sufficiently large difference of arrival times, a diffuser with larger D should be used. The roughness of the diffuser surface, however, leads to the roughness of image plane, D'. Using the lens formula, it is possible to estimate $$D' \text{ as } \left(\frac{f_s}{f_D}\right)^2 D.$$

Thus, with a proper choice of optical setup, the roughness of the image plane can be controlled below one Rayleigh length.

The Efficiency of Multi-Photon Excitation at Low Repetition Rate

To solve the limitation of low acquisition rate, the relation between the repetition rate of pulsed laser and the efficiency of multi-photon excitation is considered. For simplicity, a two-photon excitation process is modeled and the light intensity required for wide-field two-photon excitation is estimates. The signal obtained from a single laser pulse at a single pixel is:

$$s_{2p}=\beta \cdot I_p^2 \cdot \tau \quad \text{(EQ. 12)}$$

where $\beta$ is the two-photon excitation coefficient, $I_p$ is the peak intensity of the excitation pulse, and $\tau$ is pulse width. With a time unit, the signal from each pixel collected at the detector (i.e., the CCD camera), $S_{2p}$, depends on the repetition rate of the pulsed laser f according to:

$$S_{2p}=s_{2p} \cdot f \quad \text{(EQ. 13)}$$

On the other hand, within a time unit, the average intensity of the pulsed laser on a single pixel is given by:

$$I_{avg}=I_p \cdot f \quad \text{(EQ. 14)}$$

Here the intensity profile of the pulse is assumed to be a square function in the time domain. Combining EQs. 12 to 14, the following is obtained:

$$S_{2p} = \beta \cdot \frac{I_{avg}^2}{f \cdot \tau} \propto \frac{1}{f} \quad \text{(EQ. 15)}$$

which suggests that for a fixed average intensity $I_{avg}$, the signal level can be significantly enhanced by reducing the repetition rate f. For example, lowering f from 100 MHz to 1 kHz can increase the signal $10^5$ fold without increasing the average intensity. In addition, lowering the repetition rate from MHz to kHz can reduce photobleaching while maintaining the same average power. This is achieved through avoiding the dark state conversion. (See, e.g., G. Donnert, et al., Nature Methods 4(1), 81-86 (2007); and J. Mertz, European Physical Journal D 3(1), 53-66 (1998), the disclosures of which are incorporated herein by reference.) Indeed, 5 to 25-fold increment of total fluorescence yield before the molecules being bleached has been reported. (See, Donnert, et al., cited above.) Thus, the frame rate of the device can be further increased by equipping the system with a pulse laser with much lower repetition rate, e.g., around 100 Hz.

In summary, using the optical diffuser and low-repetition-rate ultrafast pulse train described above, it is possible to produce a plane-projection multi-photon microscope having excellent optical capabilities. In the following sections, examples are provided to demonstrate that the axial resolution of the plane-projection multi-photon microscopy technique of the instant invention is comparable to conventional confocal microscopy, and that the technique can be used to obtain optical sectioning of weak fluorescent signals expressed in live, 3-D epithelial tissue at a frame rate compatible with conventional epifluorescence microscopy at the same tissue.

EXEMPLARY EMBODIMENTS

The person skilled in the art will recognize that additional embodiments according to the invention are contemplated as being within the scope of the foregoing generic disclosure, and no disclaimer is in any way intended by the foregoing, non-limiting examples.

Methods and Materials

The light source used in the following examples is an ultrafast chirped pulse amplifier (Spectra-Physics® Spitfire® Pro). The amplifier is seeded by an ultrafast oscillator (Spectra-Physics® Mai Tai® SP) and they are situated parallel to each other within an enclosure. The output from the amplifier is 4 W and the repetition rate is 1 kHz. Each laser pulse contains 4 mJ of energy and has a pulse duration less than 35 fs. The laser is centered at 790 nm with a bandwidth (FWHM) ~30 nm. The output of the laser amplifier was attenuated such that the average power measured at the back aperture of the sample objective is less than 10 mW.

The roughness D of the diffuser (DG10-120, Thorlabs) is at the scale of 30 μm, and a is –0.1. The collimated laser beam is scattered by the diffuser, collected by the diffuser objective, transmitted through the beamsplitter (20RQ00UB.2, Newport and FF662-FDi01-25×36, Semrock), and then projected to the sample via the sample objectives (UPLFLN 10X and LUMFLN 60XW, Olympus). From EQ. 11, the corresponding $\bar{z}*5$ and 2.3 for UPLFLN 10X and LUMFLN 60XW, respectively. The image was obtained by a CCD camera (iXon DU-885K, Andor) through the imaging lens.

The axial resolution was determined by taking images along the optical axis of a homogeneous film (thickness less than 2 μm) of fluorescent dye (F-1300, Invitrogen). For live cell imaging, we used human mammary gland MCF-10A cells expressing cyan fluorescent protein-conjugated histone (H2B-cerulean), which bind to chromosomes and have been widely used to indicate cell nucleus. MCF-10A cells were seeded in 3D matrigel (BD Matrigel™) for 10 days to form a bowl-shape cell clusters of size of several hundred μm. The cell clusters were then used to evaluate the capability of high-frame-rate acquisition and optical sectioning of our plane-projection multi-photon microscopy. Following the acquisition of optical sectioning, the 3-D view of the epithelial tissue was reconstructed by ImageJ 3D Viewer.

Example 1

Study of Axial Resolution of Technique

Figure 4:
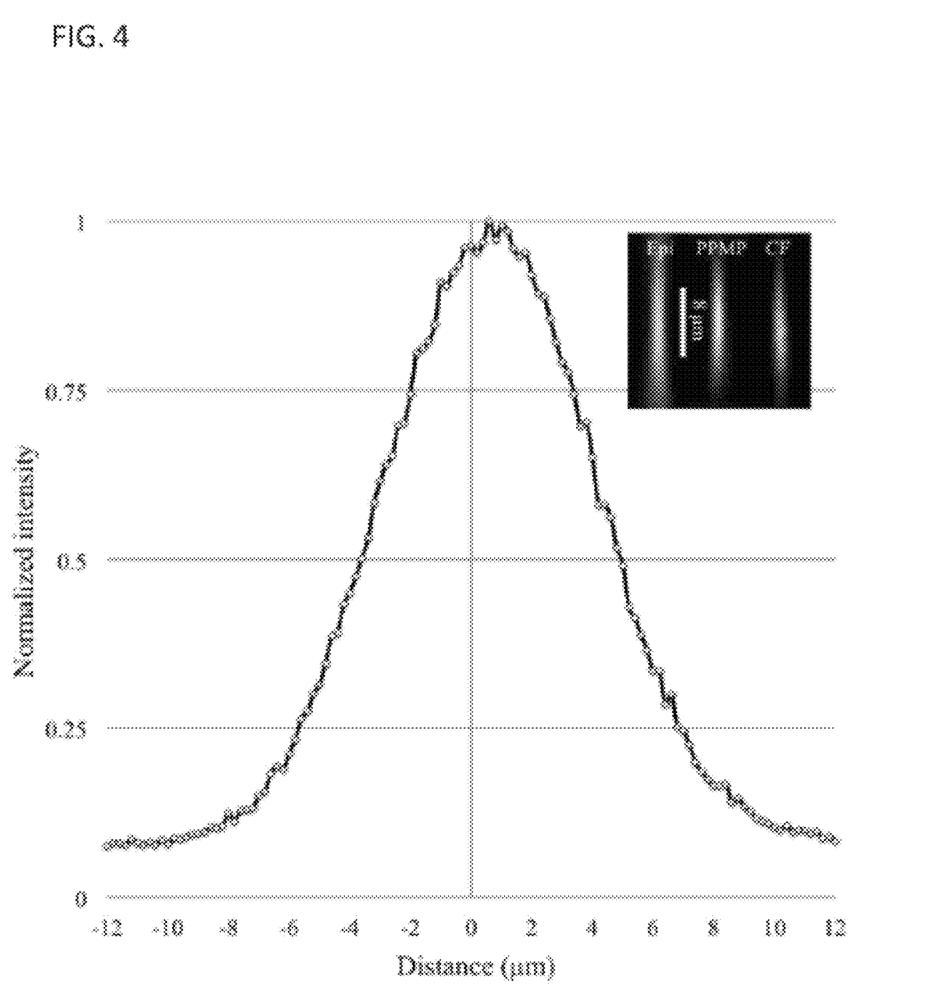
FIG. 4 provides a data plot showing an axial point spread function obtained by plane-projection multi-photon microscopy in accordance with the current invention.

FIG. 4 shows the axial resolution and the sectioning images of the optical system depicted in FIG. 1. The axial resolution was determined by the full width of half maximum (FWHM) of the axial PSF of an isolated fluorescent microspheres. In particular, the intensity profile of the brightest pixel through the sectioning of a fluorescent microsphere of diameter 1 μm was obtained and normalized by its maximum.

To obtain the axial PSF, the sample objective was moved toward the fluorescent microspheres. A stack of 120 images was acquired at a step size of 0.2 μm. For one microsphere, the maximal pixel intensity for each image was then obtained and normalized by the maximum pixel intensity of the whole stack. To compare the axial resolution, the lateral views of the sectioning image stacks were reconstructed from a conventional epifluorescence microscopy (Epi), the inventive plane-projection multi-photon microscope (PPMP), and a conventional confocal microscope (CF), as illustrated in the inset of FIG. 4. The FWHM of the axial PSF of the PPMP microscopy was found to be ~8.5 μm. For an optimized confocal microscope, the theoretical axial resolution $z_C$ is 1.4 $n\lambda/NA^2$ (see, e.g., Pawley, cited above) with NA=0.3, n=1, and λ=465 nm, $z_C \approx 7.2$ μm. Thus, it can be seen that the inventive PPMP technique achieves an axial resolution comparable to conventional confocal microscopy.

Figure 7:
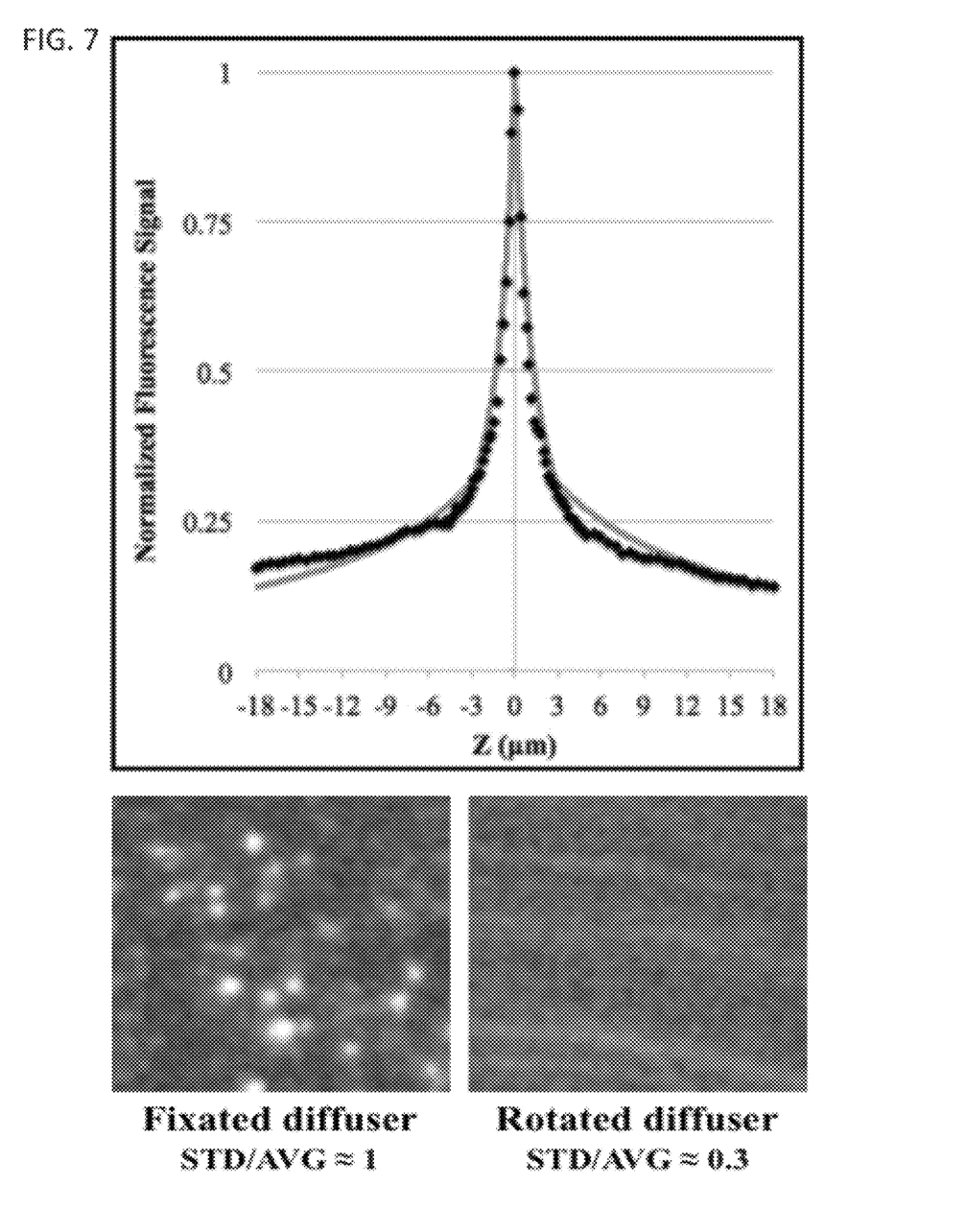
FIG. 7 provides data plots and images showing (above) a theoretical (line) and experimentally measured (black dots) signal from a homogeneous dye film by PPMPM (the curve shows a 2-µm FWHM using a NA 1.42 microscope objective, which is three times broader than an optimized confocal microscope); and (below) a field inhomogeneity (i.e., bright spots) using a fixed and rotated diffuser.

As will be described in greater detail in EXAMPLE 3, below, FIG. 7 also shows the axial resolution of the optical system depicted in FIG. 1. The axial resolution was determined by the full width of half maximum (FWHM) of the fluorescence signal. With $$\frac{f_D}{d_S} = 60,$$

NA=1.42, n=1.5, the axial resolution was found to be ~2 μm.

Example 2

Study of Optical Section of Live Tissue

Figure 5:
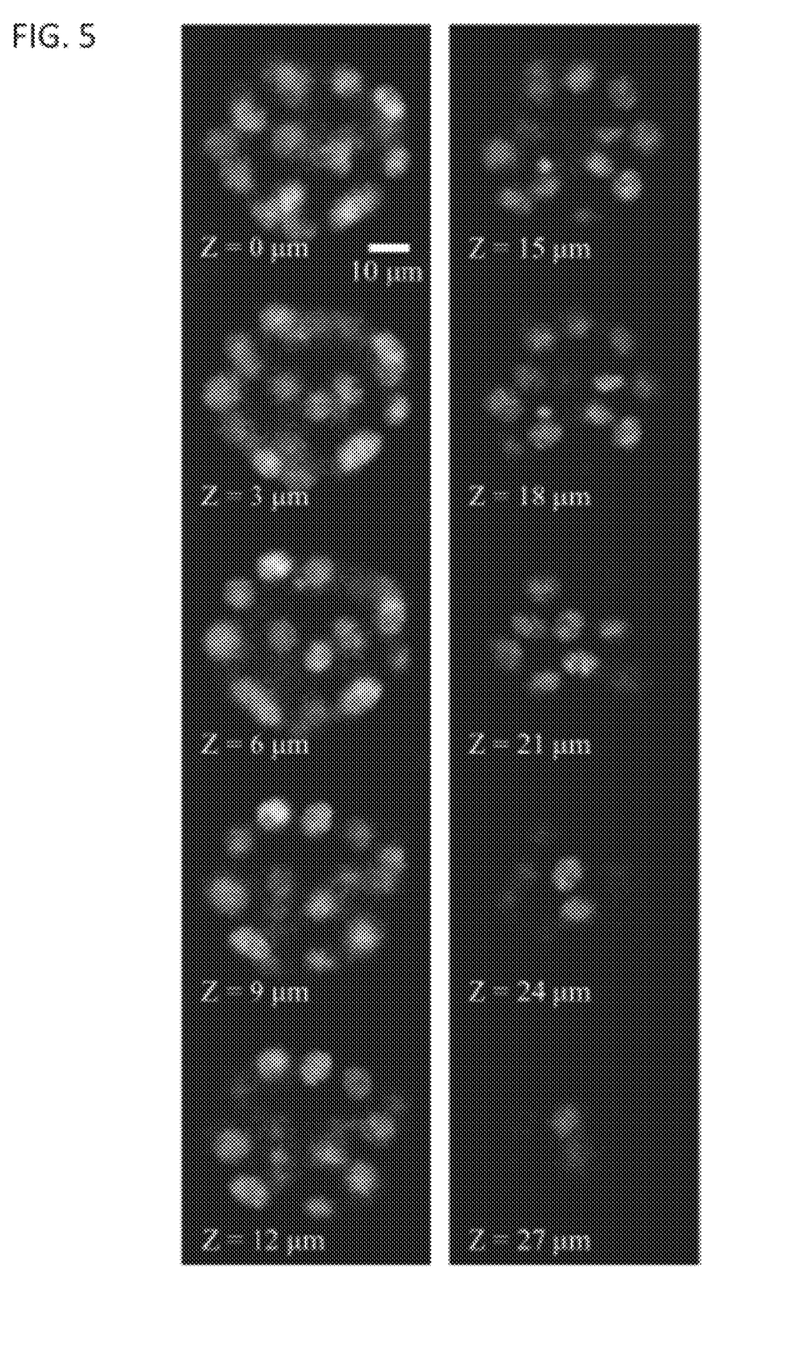
FIG. 5 provides images showing optical sections of live MCF-10A cells in a hemispherical structure in accordance with the current invention.
Figure 6:
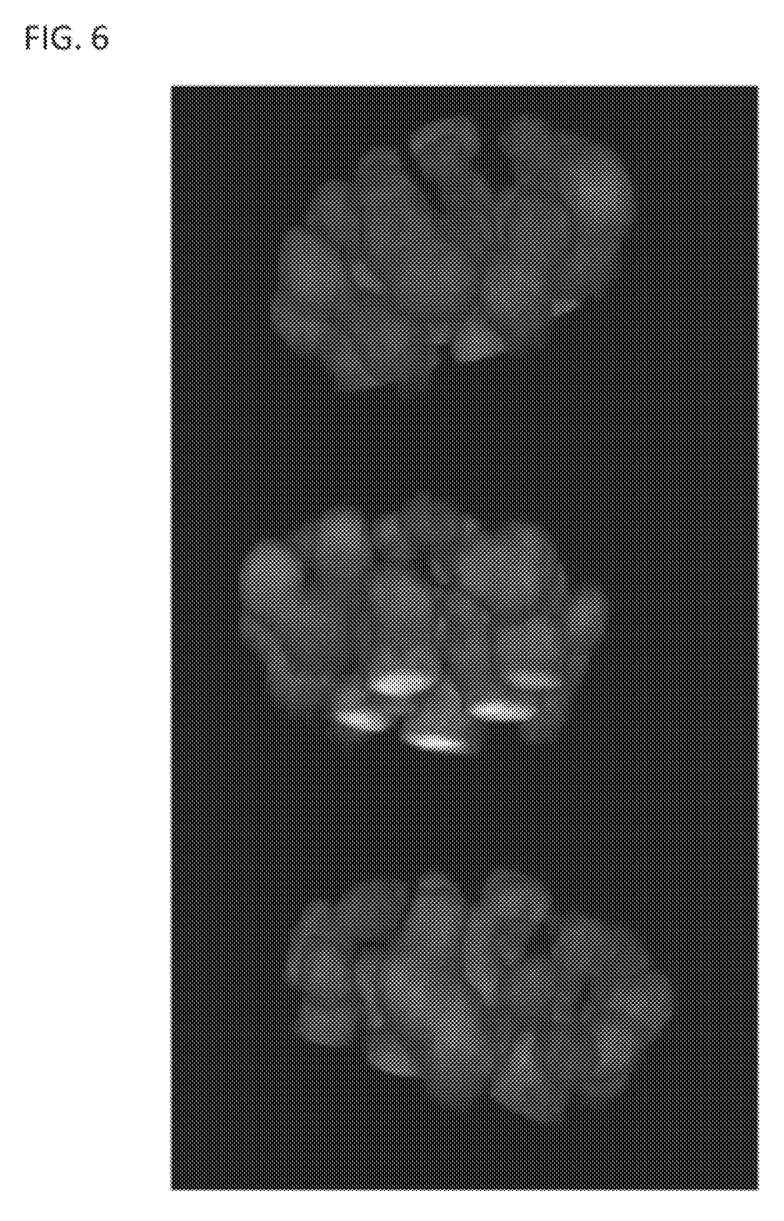
FIG. 6 provides images of reconstructed 3-D view of live MCF-10A cells in FIG. 5 in accordance with the current invention.

To demonstrate that the inventive PPMP technique has the capability of imaging live tissue at high frame rate, optical sectioning of live, 3-D MCF-10A cell clusters was performed. These results are shown in FIG. 5, showing optical sections of live MCF-10A cells in a hemispherical structure. Fluorescence signals were from cell nuclei expressing cyan fluorescent protein-conjugated histone (H2Bcerulean) which binds to chromosomes. Exposure time of each frame is 0.2 seconds, the sample objective is 60X, with NA=1.1, n=1.33, a step size of 1 μm, and a laser average power of <10 mW. The images were then used to reconstruct the 3D view, where MCF-10A cells formed a hemispherical organization, as shown in FIG. 6. The fluorescent signals resulted from cyan fluorescent As described above, the exposure time was set as 0.2 seconds, equivalent to 5 fps. This is the same order of the exposure time in a conventional epifluorescence microscopy (100-500 ms, Olympus IX71®), where the same CCD camera was used and a 120W fluorescent illumination lamp (X-CITE 120Q, EXFO) to obtain images at the same sample. This demonstrates that the inventive technique possesses the capabilities of high-frame-rate acquisition and optical sectioning at the same time.

As described above, in the exemplary embodiment used to take this data a fixed optical diffuser was utilized. This leads to an inhomogeneous illumination field, as indicated by the bright spots on the fluorescent film in FIG. 7 (discussed below). Such an imaging defect can be easily resolved by spinning the diffuser. However, the field inhomogeneity can be used as a structural illumination to enhance the axial resolution. This is achieved by spinning the diffuser stepwise and computing the root-mean-square image from the images obtained at each step. (See, M. Neil, et al., Optics Letters 22(24), 1905-1907 (1997), the disclosure of which is incorporated herein by reference.)

Example 3

Enhanced Performance Using Customized Microlens Array

As previously described, in PPMPM optical sectioning results from the scattering of the excitation light by the varied surface geometry of the optical diffuser. The scattering creates an array of point-like light sources having random time delays with respect to each other. After re-focusing, such random time delays create a concave profile for the effective pulse duration, and thus pulse width, along the optical path. (See, e.g., Yu, J.-Y. et al., Journal of Biomedical Optics, 16, 116009, (2011), the disclosure of which is incorporated herein by reference.) This profile, referred to as temporal focusing, can confine the peak excitation intensity to the image plane and hence provides optical sectioning. We note, however, that the surface geometry variation of conventional diffusers can also lead to a significant variation in the brightness of the resulting point-like light sources when imaged into the sample. This effect creates an inhomogeneity of the illumination field as shown in FIG. 7.

In particular, conventional ground-glass diffusers can introduce an inhomogeneity in the illumination field. Such defects are very likely to result from the size variation of the scattering structures formed on the diffuser surface (i.e., a larger scattering structure forms a brighter spot). Because ground-glass diffusers usually carry an isotropic variation of surface geometry, it is not easy to control the axial (parallel to optical axis) variation and the lateral (perpendicular to optical axis) sizes of the scattering structures independently; the former is required for temporal focusing, while the latter leads to field inhomogeneity.

As a result, a dilemma is encountered: it is not possible to achieve optimal optical sectioning and a homogenous illumination field at the same time. Accordingly, in some embodiments the diffuser optic is constructed as an array of microlenses having uniform size and random vertical distribution (with respect to the diffuser surface, FIG. 8). The optical path in such a setup is wavelength-independent, which enables the wide-field 4D imaging of live systems with multiple excitation wavelengths through the inventive microscope. Moreover, the low thermal damages and phototoxicity of allows for the performance of long-term 4D imaging at short time intervals.

To precisely control the illumination and axial positions of point-like light sources, some embodiments of the invention use a microlens array. This allows for the engineering of a) the lateral distribution and sizing of the lenses to dictate the homogeneity of the illumination field, and b) the axial distribution of lenses with respect to the diffuser surface to set the axial resolution. The mechanism underlying diffuser-based temporal focusing is to create random time delay on the scatterer. To achieve an optical sectioning resolution equal to that of laser scanning microscopy, the ideal time delay between two adjacent microlenses must be equal to or larger than the pulse duration of the ultrafast pulses. The minimal discrepancy between two different heights is therefore determined by the pulse duration and the refractive index of the scatterer. For a material of ~1.5 refractive index and a 35-fs pulse duration, we estimate the minimal lens-to-lens step in height to be ≥20 µm.

In particular, to create homogeneous illumination, it is necessary to have a constant lens-to-lens spacing and numerical aperture (NA) for each microlens. This ensures the focal spots formed by the microlenses have equal brightness on the specimen plane. The illumination field is further homogenized by making each focal spot partially overlap with its nearest neighbors. This can be done by appropriately adjusting the spacing of the microlenses. Accordingly, the appropriate spacing of microlenses, when multiplied by the de-magnification factor ($f_S/f_D$) (FIG. 1), should be equal to or slightly smaller than the size of the diffraction-limited spot for the microscope objective. Based on the geometry of the PPMPM microscope, this spacing is preferably between 10 and 20 µm, depending on the microscope objective. In addition, to optimize the optical sectioning, the beam coming out from a single microlens should slightly overfill the back aperture of the microscope objective. Taking this into account, the appropriate NA can be estimated for the microlenses. Similar to a conventional temporal-focusing system[[4]], the scattering plane (here it is the microlens array) is placed in conjugation to the specimen plane (FIG. 1). The appropriate NA is then found to be slightly larger than $D_O/2f_D$, where $D_O$ is the diameter of the back aperture of the microscope objective. Based on this estimation, the appropriate NA for the microlenses preferably lies between 0.08 and 0.06.

The Human mammary gland (MCF-10A) cells are a popular cell line for epithelial morphogenesis studies in 3-D space. (See, e.g., Martin-Belmonte, F. & Mostov, K., Curr Opin Cell Biol 20, 227-234, (2008); Muthuswamy, S. K., et al., Nat Cell Biol 3, 785-792, (2001); and Petersen, O. W., et al., Proc Natl Acad Sci USA 89, 9064-9068 (1992), the disclosures of each of which are incorporated herein by reference.) As shown in FIG. 7 (right), this cell line was used for a preliminary test. Simple chemical etching was performed on ground-glass diffusers to improve the homogeneity of the illumination field. As shown in FIG. 7, the diffusers with improved homogeneity also show improved imaging capabilities.

Figure 8:
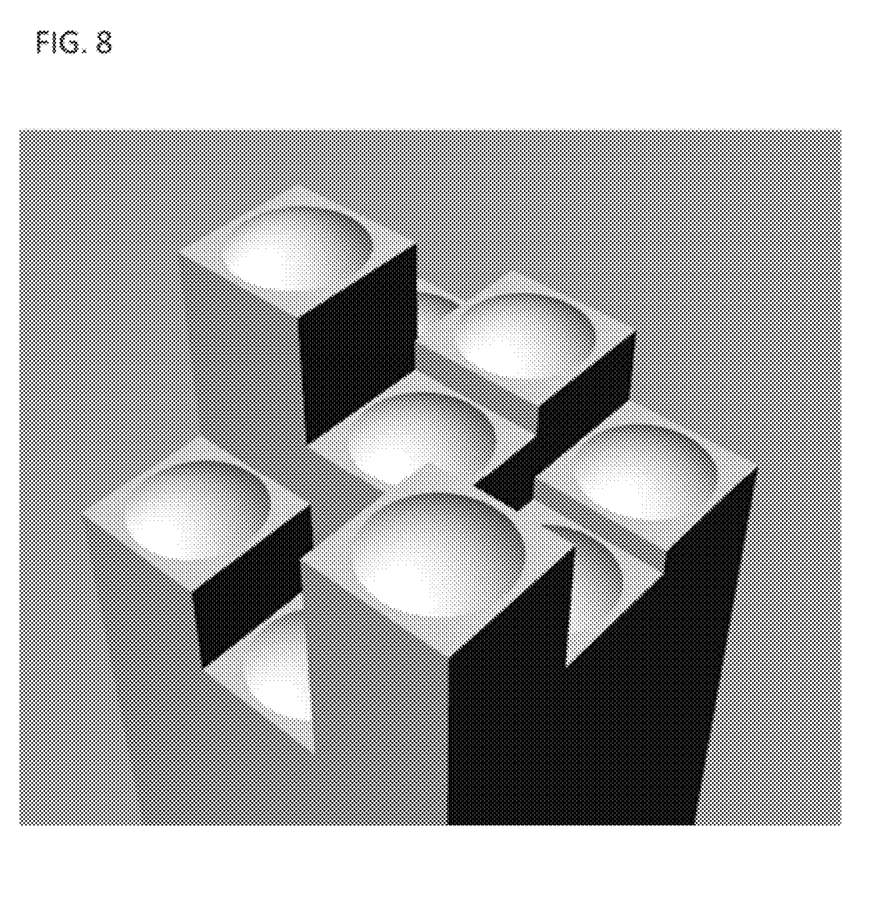
FIG. 8 provides a schematic of a 3-by-3 microlens array with the microlenses at various heights in accordance with one embodiment of the current invention.

The inventive microlens array for temporal focusing has a unique feature not found in standard microlens arrays: the height of each microlens has to be different from its neighbors, as shown in FIG. 8. However, as discussed above, using such a microlens array, it should be possible to achieve diffraction-limited spatial resolution with an optically uniform illumination field. Such a microlens array will make it possible to generate a homogeneous illumination field. In addition, the vertical distribution of the lenses (with respect to the microlens surface) of the microlenses may be optimized to achieve temporal focusing equivalent to diffraction-limited optical sectioning.

Example 4

Harmonic Generation Microscopy

Harmonic generation is also a multiphoton process as multi-photon excitation. By using appropriate wavelengths the inventive setup can also perform harmonic generation microscopy. As such, by manipulating the polarization of the ultrafast pulse train, the technique can also image the polarization anisotropy of biological tissues. (See, e.g., Beop-Min Kim, et al., Lasers in Surgery and Medicine, 27:329-355 (2000), the disclosure of which is incorporated herein by reference.)

Example 5

Multi-Wavelength Imaging

By adding optical parametric amplifier, it is possible to generate several wavelengths simultaneously to perform multi-wavelength imaging. This can be achieved using a single ultrafast amplifier. For example, PPMPM may simultaneously have three different wavelength windows, covering from blue to red fluorophores.

Figure 9:
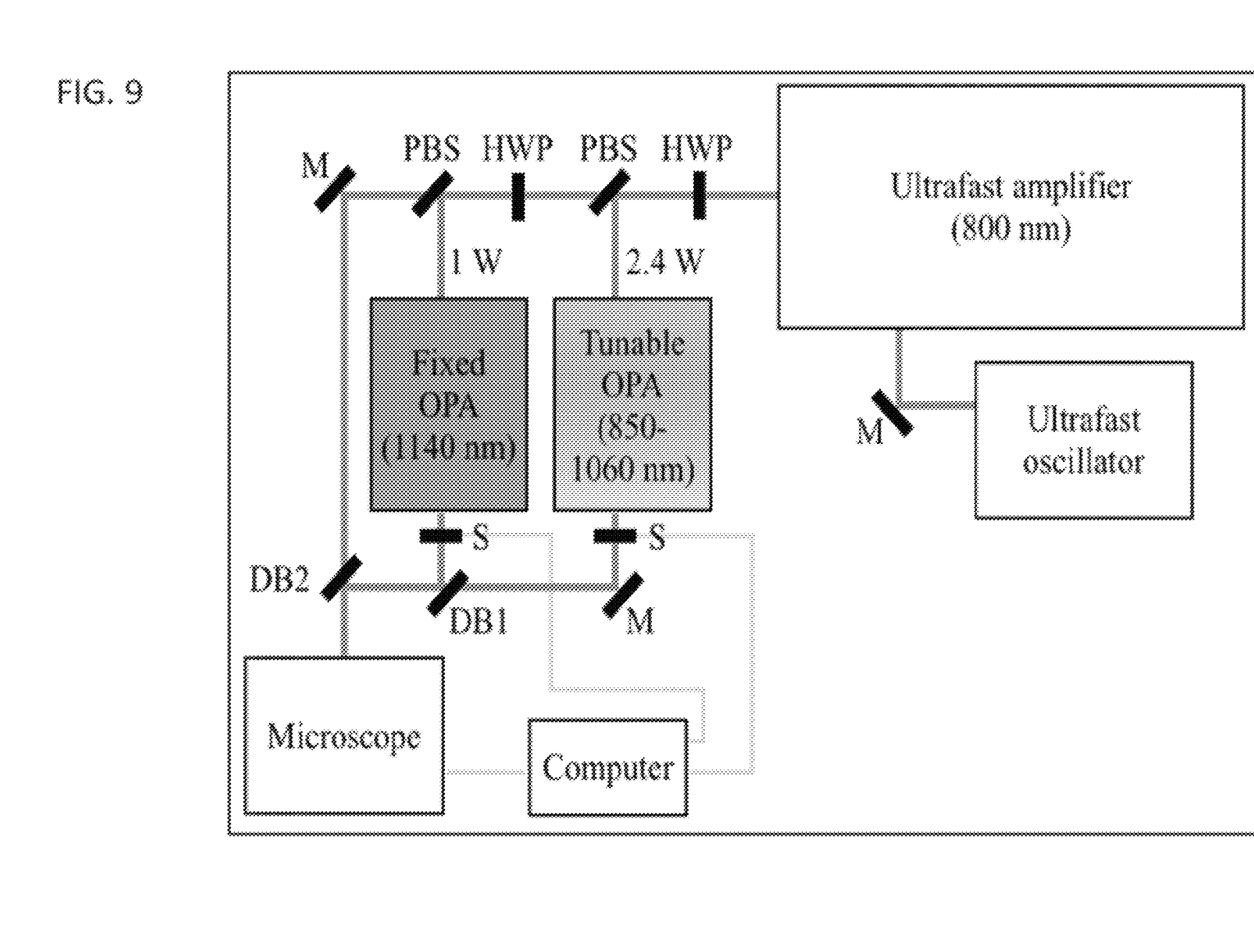
FIG. 9 provides a block diagram of an exemplary embodiment of a multi-wavelength PPMPM, where M is a mirror, HWP is a half-wave plate, PBS is a polarizing beamsplitter, S is a electronic shutter, DB1 is a short-wave-pass dichroic beamsplitter, transmission cut-off at 1100 nm, DB2 is a short-wave-pass dichroic beamsplitter, transmission cut-off at 820 nm.

Specifically, the wavelength window that is commonly used in biomedical multi-photon imaging extends from 850 nm to 1200 nm. However, conventional ultrafast amplifiers do not provide tunable wavelengths. This is because the blazed gratings used in the optical amplification process are designed for a specific wavelength window (typically centered at 800 nm). To convert the 800-nm wavelength of ultrafast amplifiers, OPAs have been widely adopted. The range of wavelength conversion in commercially available OPA systems equipped with harmonic-generation extension generally covers 500-2500 µm. Accordingly, in some embodiments an OPA-based, wavelength-tunable unit may be used to perform multi-wavelength excitation with PPMPM (FIG. 9).

In one exemplary embodiment, the OPA is integrated into the microscope by placing programmable shutters in front of each OPA output. Then an appropriate dichroic beamsplitter is used to merge the beams of different wavelengths before the microlens array as shown in FIG. 9. Such a design will facilitate the operation of time-lapse, multi-color imaging. With such a microscope, it will be possible to observe long-term (>>36h) 4D dynamics of living cells at short time interval (1-8 mins), and the interactions of molecules labeled with biological fluorophores, expressed by the cells or embedded in extracellular matrix (ECM). The idler wavelength of the OPA unit can be made to be tunable from 850 to 2680 nm. Pulse durations may be made between 40-100 fs for short (~40 fs) pump pulses. The pulses can be markedly shortened, though, by placing a pulse compressor, such as a simple SF10 prism pair, at the OPA output to obtain the expected pulse duration performance. Furthermore, for any short pulse, from either OPA, sent through the microscope, it will be necessary to pre-compensate the pulses for the group velocity dispersion introduced by the optical materials along the beam path. This can be achieved by the same SF10 prism pair for the OPA. Proper compression and compensation is achieved when the pulse duration at the sample is minimized—this can be done by adjusting compression for maximally efficient multiphoton excitation in the sample. (For greater detail, see, e.g., Wilson, JOSA B, 14 (1997); Cerullo, Review of Scientific Instruments 74 (2003); Nisoli, M. et al., Opt Lett 19, 1973-1975 (1994); and Piel, J., et al., Opt Lett 25, 180-182 (2000), the disclosures of each of which are incorporated herein by reference.)

Example 6

Ultrafast Snapshot Imaging

The pulse duration of the ultrafast pulse train of the current invention is ~30 fs, as a result, it is possible to utilize such short pulses to perform an ultrafast snapshot of the sample. In such a scheme, the image is obtained under single pulse excitation. It should be noted that the lifetime of the fluorescence of most fluorescent proteins is ~1-100 ns, which is much longer that the pulse duration. Therefore, for multiphoton excitation the effective exposure (flash) time is 1-100 ns rather than ~30 fs of the ultrafast snapshot imaging technique.

SUMMARY

How to increase image acquisition rate and axial resolution has been a long-stand challenge in the optical microscopy community. It has now been discovered and demonstrated that plane-projection multi-photon microscopy can be achieved by using optical diffuser and ultrafast laser pulses of low repetition rate. Compared with conventional multi-photon scanning microscopy, the peak excitation intensity $I_p$ of the inventive technique is at similar order of magnitude, while the average excitation intensity $I_{avg}$ is $10^5$-fold weaker. Because the thermal mechanical damage in multi-photon microscopy results mostly from single photon-absorption processes (Masters, et al., cited above) lower thermal damage with much weaker average excitation intensity can be attained using the inventive technique.

In summary, it has been demonstrated that the inventive PPMP technique provides comparable axial resolution as confocal microscopy and equivalent frame-rate as epifluorescence microscopy for live tissue imaging. Moreover, plane-projection multi-photon microscopy has several advantages over confocal and multi-photon scanning laser microscopy. First, the design is as simple as a conventional epifluorescence microscope. Second, the axial resolution can be improved by incorporating several well-developed techniques such as structured light microscopy. (See, M. Neil, et al., cited above.) Third, even at a high-frame-rate acquisition, the thermal damage and photobleaching is lower than that of conventional multi-photon laser scanning microscopy. On the other hand, compared with temporal focusing technique using MHz repetition-rate laser pulses, the low repetition-rate pulses can significantly enhance the SNR and reduce the photobleaching. In addition, system provides the flexibility for a tunable-wavelength light source. At the same time, the field inhomogeneity induced by the diffuser can be used to go beyond diffraction-limited axial resolution. Together, these advantages facilitate three-dimensional observations of fast biochemical and biomechanical processes with minimal photo/thermo-damage at the samples.

Doctrine of Equivalents

Those skilled in the art will appreciate that the foregoing examples and descriptions of various preferred embodiments of the present invention are merely illustrative of the invention as a whole, and that variations in the steps and various components of the present invention may be made within the spirit and scope of the invention. Accordingly, the present invention is not limited to the specific embodiments described herein but, rather, is defined by the scope of the appended claims.

What is claimed is:

1. A plane-projection multi-photon microscope comprising:
    a sample holder;
    at least one excitation source, said excitation source being capable of producing an excitation power of adequate intensity to induce significant levels of multi-photon excitation in a sample and being disposed such that the excitation is directed along at least one excitation beam path;
    at least one excitation optic comprising at least a scatterer having one of either a spatially variable optical path length or spatially variable refractory index sufficient to transform the excitation source into an excitation plane of randomly temporally separated point light sources, and further comprising at least one excitation objective for focusing and confining a peak excitation intensity of said excitation plane onto and within at least a portion of the sample holder such that a sample excitation region is delineated; and
    an imaging detector defining at least one detection beam path and capable of detecting an excitation generated signal contrast from the sample excitation region, the detector being disposed such that the detection direction of the at least one detection beam path is substantially orthogonal to the sample excitation region wherein the excitation objective of the excitation optic comprises at least two lenses; wherein the excitation objective of the excitation optic comprises at least two lenses; wherein the difference in axial height between any two adjacent microlenses is chosen such that the time delay between the two adjacent microlenses is equal to or larger than the pulse duration of a pulse from the excitation source.

2. The microscope as claimed in claim 1, wherein the number of photons in the multi-photon excitation is two.

3. The microscope as claimed in claim 1, wherein the excitation source is a pulsed near-infrared laser selected from the group consisting of lasers having peak duration in the nanosecond, picosecond, and femtosecond range.

4. The microscope as claimed in claim 1, wherein the detected signal contrast is selected from the group consisting of fluorescence, harmonic generation, sum frequency generation, and Raman scattering.

5. The microscope as claimed in claim 1, wherein the scatterer of the excitation optic comprises at least an optical diffuser having a surface roughness of at least 20 μm.

6. The microscope as claimed in claim 5, wherein the roughness of the diffuser and the magnification of the excitation objective of the excitation optic are chosen such that the roughness of the image plane is constrained below one Rayleigh length.

7. The microscope as claimed in claim 5, wherein the diffuser is rotatable in a stepwise manner.

8. The microscope as claimed in claim 1, wherein the numerical aperture of the excitation focusing optics is adjustable.

9. The microscope as claimed in claim 1, wherein the excitation source is a pulse laser, and wherein the pulse energy is higher than 1 μJ.

10. The microscope as claimed in claim 1, wherein the excitation source is a pulse laser, and wherein the pulse duration is ~30 fs.

11. The microscope as claimed in claim 1, wherein the minimal difference in axial height between any two adjacent microlenses is 20 μm.

12. The microscope as claimed in claim 1, wherein the lateral spacing between any two adjacent microlenses is constant.

13. The microscope as claimed in claim 1, wherein the NA of the microlenses is constant.

14. The microscope as claimed in claim 1, wherein the focal spots generated by adjacent microlenses partially overlap.

15. The microscope as claimed in claim 14, wherein the microlenses are spaced such that the lateral spacing multiplied by the de-magnification factor (fS/fD) is equal to or less than the size of the diffraction-limited spot of the microscope.

16. The microscope as claimed in claim 15, wherein the lateral spacing is between 10 and 20 μm.

17. The microscope as claimed in claim 1, wherein the NA of the microlenses is larger than $D_O/2fD$, where $D_O$ is the diameter of the back aperture of the microscope.

18. The microscope as claimed in claim 17, wherein the NA of the microlenses is between 0.08 and 0.06.

19. The microscope as claimed in claim 1, further comprising an optical parametric amplifier to simultaneously generate a multi-wavelength excitation source.

20. A method of imaging an object using plane-projection multi-photon microscope comprising:
providing at least one excitation source, said excitation source being capable of producing an excitation power of adequate intensity to induce significant levels of multi-photon excitation in a sample and being disposed such that the excitation is directed along at least one excitation beam path;
directing said excitation through at least one excitation optic comprising at least a scatterer having one of either a spatially variable optical path length or spatially variable refractory index sufficient to transform the excitation source into an excitation plane of randomly temporally separated point light sources, and further comprising at least one excitation objective for focusing and confining the peak excitation intensity of said excitation plane onto and within at least a portion of a sample holder; and
imaging the excitation through an imaging detector defining at least one detection beam path and capable of detecting a excitation generated signal contrast from the sample excitation region, the detector being disposed such that the detection direction of the at least one detection beam path is substantially orthogonal to the sample excitation region wherein the excitation objective of the excitation optic comprises at least two objective lenses; wherein the scatterer of the excitation optic comprises at least one of either an optical diffuser or an array of microlenses having uniform size and variable axial height; wherein the difference in axial height between any two adjacent microlenses is chosen such that the time delay between the two adjacent microlenses is equal to or larger than the pulse duration of a pulse from the excitation source.

21. The method claimed in claim 20, wherein the minimal difference between any two adjacent microlenses is 20 μm, given the refractive index of the microlens material is ~1.5.

22. The method claimed in claim 20, wherein the NA of the microlenses is constant.

23. The method claimed in claim 20, wherein the focal spots generated by adjacent microlenses partially overlap.

24. The method claimed in claim 23, wherein the microlenses are spaced such that the lateral spacing multiplied by the de-magnification factor (fS/fD) is equal to or less than the size of the diffraction-limited spot of the microscope.

25. The method claimed in claim 24, wherein the lateral spacing is between 10 and 20 μm.

26. The method claimed in claim 20, wherein the NA of the microlenses is larger than $D_O/2fD$, where $D_O$ is the diameter of the back aperture of the microscope.

27. The method claimed in claim 26, wherein the NA of the microlenses is between 0.08 and 0.06.

28. The method as claimed in claim 20, wherein the number of photons in the multi-photon excitation is two.

29. The method as claimed in claim 20, wherein the excitation source is a pulsed near-infrared laser selected from the group consisting of lasers having peak duration in the nanosecond, picosecond, and femtosecond range.

30. The method as claimed in claim 20, wherein the detected signal contrast is selected from the group consisting of fluorescence, harmonic generation, sum frequency generation, and Raman scattering.

31. The method as claimed in claim 20, wherein the scatterer of the excitation optic comprises at least an optical diffuser having a surface roughness of at least 20 μm.

32. The method as claimed in claim 31, wherein the roughness of the diffuser and the magnification of the excitation objective of the excitation optic are chosen such that the roughness of the image plane is constrained below one Rayleigh length.

33. The method as claimed in claim 31, wherein the diffuser is rotatable in a stepwise manner.

34. The method as claimed in claim 20, wherein the numerical aperture of the excitation focusing optics is adjustable.

35. The method as claimed in claim 20, wherein the excitation source is a pulse laser, and wherein the pulse energy is higher than 1 μJ.

36. The method as claimed in claim 20, wherein the excitation source is a pulse laser, and wherein the pulse duration is ~30 fs.

* * * * *